(12) United States Patent
Adelman et al.

(10) Patent No.: US 7,761,565 B2
(45) Date of Patent: Jul. 20, 2010

(54) SYSTEM FOR TRACKING DOMAIN NAME RELATED REPUTATION

(75) Inventors: Warren Adelman, Scottsdale, AZ (US); Michael Chadwick, Chandler, AZ (US)

(73) Assignee: The Go Daddy Group, Inc., Scottsdale, AZ (US)

( * ) Notice: Subject to any disclaimer, the term of this patent is extended or adjusted under 35 U.S.C. 154(b) by 0 days.

(21) Appl. No.: 12/409,494

(22) Filed: Mar. 24, 2009

(65) Prior Publication Data

US 2009/0216905 A1 Aug. 27, 2009

Related U.S. Application Data

(62) Division of application No. 10/977,373, filed on Oct. 29, 2004.

(51) Int. Cl.
*G06F 15/16* (2006.01)
(52) U.S. Cl. .................. 709/224; 709/201; 709/203; 709/223; 709/225; 707/748; 707/751
(58) Field of Classification Search .............. 709/201, 709/203, 223, 224, 225; 707/748, 751
See application file for complete search history.

(56) References Cited

U.S. PATENT DOCUMENTS

| | | | |
|---|---|---|---|
| 6,880,007 B1 * | 4/2005 | Gardos et al. ............... 709/225 |
| 7,039,697 B2 * | 5/2006 | Bayles ....................... 709/223 |
| 7,467,140 B2 * | 12/2008 | Monroe ....................... 707/10 |
| 7,467,206 B2 * | 12/2008 | Moore et al. ................ 709/225 |
| 7,516,418 B2 * | 4/2009 | Herley et al. ................ 715/816 |
| 2002/0133365 A1 * | 9/2002 | Grey et al. ..................... 705/1 |

\* cited by examiner

*Primary Examiner*—Jinsong Hu
(74) *Attorney, Agent, or Firm*—Sergey G. Zaytsev

(57) ABSTRACT

Systems and methods of the present invention allow for tracking of domain name related reputation by a domain name Registering Entity (e.g. Registry, Registrar, etc.). In a preferred embodiment, the Registering Entity maintains a database with reputation data that can be accessed by the requesters. The Registering Entity may update reputation data based on a variety of events related to the domain name. The reputation data may be tracked on the domain name itself, URLs, domain name purchaser or registrant, or email addresses associated with the domain name. The reputation data may include various categories, such as email practices, website content, privacy policies and practices, fraudulent activities, domain name related complaints, overall reputation, etc. The registrant may opt for a reputation service while registering domain name. The requester may decide whether to allow email messages or to visit URLs based on the domain name related reputation.

20 Claims, 5 Drawing Sheets

SYSTEM FOR TRACKING DOMAIN NAME RELATED REPUTATION

CROSS REFERENCE TO RELATED PATENT APPLICATIONS

The present application is a divisional of U.S. patent application Ser. No. 10/977,373, titled "Tracking Domain Name Related Reputation," filed Oct. 29, 2004.

This patent application is also related to the following patent applications, all assigned to The Go Daddy Group, Inc:

U.S. patent application Ser. No. 10/976,834, titled "Publishing Domain Name Related Reputation in WHOIS Records," filed Oct. 29, 2004.

U.S. patent application Ser. No. 10/976,547, titled "Presenting Search Engine Results Based on Domain Name Related Reputation," filed Oct. 29, 2004.

U.S. patent application Ser. No. 12/409,495, titled "System for Tracking Domain Name Related Reputation," filed Mar. 23, 2009, which is a divisional of U.S. patent application Ser. No. 10/977,373.

U.S. patent application Ser. No. 12/409,492, titled "Method for Accessing Domain Name Related Reputation," filed Mar. 23, 2009, which is a divisional of U.S. patent application Ser. No. 10/977,373.

FIELD OF THE INVENTION

The present invention relates to systems and methods for tracking domain name related reputations, such as reputations of domain names, reputations of domain name registrants, and reputations of email addresses.

BACKGROUND OF THE INVENTION

The Internet is a worldwide network of computers and computer networks arranged to allow the easy and robust exchange of information between users of computers. Hundreds of millions of people around the world have access to computers connected to the Internet via Internet Service Providers (ISPs). Content providers place multimedia information, i.e. text, graphics, sounds, and other forms of data, at specific locations on the Internet referred to as websites. The combination of all the websites and their corresponding webpages on the Internet is generally known as the World Wide Web (WWW) or simply web.

Websites may be created using HyperText Markup Language (HTML) to generate a standard set of tags that define how the webpages for the website are to be displayed. Users of the Internet may access content providers' websites using software known as an Internet browser, such as MICROSOFT INTERNET EXPLORER or NETSCAPE NAVIGATOR. After the browser has located the desired webpage, it requests and receives information from the webpage, typically in the form of an HTML document, and then displays the webpage content for the user. The user may then view other webpages at the same website or move to an entirely different website using the browser.

Websites allow businesses and individuals to share their information with a large number of Internet users. Further, many products and services are offered for sale on the Internet, thus elevating the Internet to an essential tool of commerce.

Electronic mail or email is another important part of the Internet. Email messages may contain, for example, text, images, links, and attachments. Email is one of the most widely used methods of communication over the Internet due to the variety of data that may be transmitted, large number of available recipients, speed, low cost and convenience.

Email messages may be sent, for example, between friends, family members or between coworkers thereby substituting for traditional letters and office correspondences in many cases. This is made possible because the Internet has very few restrictions on who may send emails, the number of emails that may be transmitted and who may receive the emails. The only real hurdle for sending emails is the requirement that the sender must know the email address (also called network mailbox) of the intended recipient.

Email messages travel across the Internet, typically passing from server to server, at amazing speeds achievable only by electronic data. The Internet provides the ability to send an email anywhere in the world, often in less than a few seconds. Delivery times are continually being reduced as the Internet's ability to transfer electronic data improves.

Most internet users find emails to be much more convenient than traditional mail. Traditional mail requires stamps and envelopes to be purchased and a supply maintained, while emails do not require the costs and burden of maintaining a supply of associated products. Emails may also be sent with the click of a few buttons, while letters typically need to be transported to a physical location, such as a mail box, before being sent.

Once a computer and an Internet connection have been purchased, there are typically few additional costs associated with sending emails. This remains true even if millions, or more, of emails are sent by the same user. Emails thus have the extraordinary power of allowing a single user to send one or more messages to a very large number of people at an extremely low cost.

The Internet has become a very valuable tool for business and personal communications, information sharing, commerce, etc. However, some individuals have abused the Internet. Among such abuses are phishing, spam, and posting of illegal content on a website (e.g. child pornography). Phishing is the luring of sensitive information, such as passwords, credit card numbers, bank accounts and other personal information, from an Internet user by masquerading as someone trustworthy with a legitimate need for such information. Spam or unsolicited email is flooding the Internet with many copies of the identical or nearly identical message, in an attempt to force the message on people who would not otherwise choose to receive it. Most spam is commercial advertising, often for dubious products, get-rich-quick schemes, or quasi-legal services.

A single spam message received by a user uses only a small amount of the user's email account's allotted disk space, requires relatively little time to delete and does little to obscure the messages desired by the user. Even a small number of spam messages, while still annoying, would nonetheless cause relatively few real problems. However, the number of spam transmitted over the Internet is growing at an alarming rate. While a single or small number of spam messages are annoying, a large number of spam can fill a user's email account's allotted disk space thereby preventing the receipt of desired emails. Also, a large number of spam can take a significant amount of time to delete and can even obscure the presence of desired emails in the user's email account.

Spam currently comprises such a large portion of Internet communications that they actually cause data transmission problems for the Internet as a whole. Spam creates data log jams thereby slowing the delivery of more desired data through the Internet. The larger volume of data created by spam also requires the Internet providers to buy larger and more powerful, i.e. more expensive, equipment to handle the additional data flow caused by the spam.

Spam has a very poor response rate compared to other forms of advertisement. However, since almost all of the costs/problems for transmitting and receiving spam are absorbed by the recipient of the spam and the providers of the hardware for the Internet, spam is nevertheless commercially viable for a spammer due to the extremely low cost of transmitting the spam.

There are various techniques used for combating Internet abuses. Among them: an SSL (Secure Socket Layer) protocol in conjunction with a Certification Authority that authenticates the owners of the domain name, spam filtering, email challenge-response systems, maintaining white and/or black lists for email addresses, domain names, and IP (Internet Protocol) numbers, etc.

Below are a few examples of the systems (some reputation-based) that combat spam.

The SENDERBASE system keeps track of the amount of email messages originating from various domain names and IP addresses. IRONPORT SYSTEMS INC., a company that maintains SENDERBASE.ORG, explains how it works in this example: "If a sender has high global volumes of mail—say 200 Million messages per day—from a network of 5 different domains and 1,700 IP addresses that have only been sending mail for 15 days yet have a high end user complaint rate and they don't accept incoming mail, they will have a very low reputation score [ . . . ]. If a sender is a Fortune 500 company, they will likely have much more modest global email volumes—say 500,000 messages per day—will have a smaller number of IPs and domains with a long sending history, they will accept incoming email and have low (or zero) end user complaint rates."

The Bonded Sender Program maintains a white list-like service. The participants of the service must adhere to the rules and post a bond to be included on the white list.

SPAMCOP maintains a black list of IP addresses and allows users to report spam to a centralized database.

Multiple solutions are created for establishing "societies" of trusted users. Some solutions keep track of user reputation or trust level.

CLOUDMARK, Inc. provides spam filtering and allows users to block or unblock messages manually. The users' votes on messages (blocking and unblocking) are reported to a centralized database, allowing for better spam filtering by reducing the number of false positives. Each CLOUDMARK user is assigned with a reputation (trust rating). If a malicious user unblocks a spam message, while a large number of other users block it, the malicious user's reputation will go down. If a user votes along the lines with the rest of the users, her/his reputation raises.

VERISIGN, Inc. maintains the list of domain names that were issued a VERISIGN SSL digital certificate, so called "Verified Domains List." The company plans to make the list accessible to third parties.

Some systems suggest publishing reputation data in the DNS (Domain Name System) records.

For the reputation-based systems to work properly, the sender's email address or at least its domain name part should be correct. Often malicious users forge (spoof) the sender's email address when they send out spam, viruses, or phishing email messages. Among the solutions to this problem are MICROSOFT's Sender ID and YAHOO's Domain Keys. The Sender ID proposal envisions publishing the sender's email IP address in the DNS records of the sender's server. This allows the receiver of the email message to compare the originating IP address in the email with the IP address published in the DNS. If they don't match, the email address was forged. The Domain Keys proposal utilizes public-private key infrastructure. The sender publishes its public key in the DNS records and digitally signs outgoing email messages with its private key. The receiver can validate the sender's signature using the sender's public key published in the DNS records.

Even though multiple reputation-based systems are being used, the amount of spam and other Internet abuses is steadily rising. Existing systems are numerous but often are not connected and none of them utilize the unique role of a domain name Registry or a domain name Registrar on the Internet. Internet users do not know which system to use and often cannot even find them. Many systems require participation (membership) in a trusted society, thus alienating users who are not part of the society. Some of the systems also do not provide dynamic updates of the reputation over time.

Therefore, new systems and methods are needed to overcome the limitations of the current systems and methods. It is desired to create systems and methods that provide more efficient solutions for combating Internet abuses through reputation tracking.

SUMMARY OF THE INVENTION

The limitations cited above and others are substantially overcome through the systems and methods disclosed herein. The systems and methods of the present invention allow for more efficient tracking of domain name related reputation and as a result in combating various Internet abuses.

Certain embodiments of the present invention take advantage of the unique role of a domain name Registry or a domain name Registrar (hereinafter, Registering Entity) in the Internet. Typically, a Registering Entity has access to the information that other parties do not. This includes, client contact information, billing records, complaints against clients, etc. If the Registering Entity is also a PKI (public key infrastructure) certification authority, it has access to an even wider range of information obtained through a verification process of its clients.

The preferred embodiment of the present invention calls for establishing and maintaining a reputation database by a Registering Entity for its clients. Reputation data may be tracked with relation to the domain name itself, URLs (Uniform Resource Locators) associated with the domain name, domain name purchaser or registrant, or email addresses associated with the domain name. The reputation data may include ratings for various categories, such as email practices, website content, privacy policies and practices, fraudulent activities, domain name related complaints, overall reputation, etc. The Registering Entity may update reputation data based on a variety of events related to the domain name.

One of the embodiments of the present invention allows a registrant to vet for the reputation service, while the registrant is registering or renewing a domain name (point of sale). If the registrant decides to opt for the reputation service, the Registering Entity may verify the registrant and set reputation to initial value. Verification may include validating information appearing in the WHOIS records or in private registration records.

When a recipient receives an email message from a sender, the recipient can determine a domain name from which the message originated. Then, through Registry's WHOIS records, the recipient may determine the Registrar of the domain name. Finally, the recipient will access a reputation data, maintained by the Registrar. The reputation data may be for the domain name itself, domain name registrant, sender's email address, etc. Access to the domain name related reputation data will help to determine if the recipient should allow (accept) the email message from the sender.

Similarly, if an Internet user intends to visit a webpage located at a URL, the Internet user may first check reputation data for the domain name associated with the URL. Each URL may have its own reputation rating as well.

Access to the reputation data and other tasks may be accomplished automatically by computer programs. Such programs may be running in conjunction with client or server email software, Internet browsers, or ISP (Internet Service Provider) software.

Additionally, the Registering Entity or another party may publish domain name related reputation data in the WHOIS records. Reputation ratings or values may be published in the WHOIS records of the domain name. Alternatively, links or references to a location of the reputation ratings or values may be published in the WHOIS; such links or references may include a URL link, a DNS address, an IP address, a computer port or any combination thereof. One embodiment of the method for publishing the domain name related reputation data in the WHOIS records includes the following steps, the Registering Entity collects domain name related information and forms domain name related reputation data. Then, the Registering Entity stores the domain name related reputation data in the WHOIS records.

Domain name related reputation may be used as one of the parameters for presenting search engine results. The links to the domain names or URLs with a low reputation may be moved closer to the end of the search engine results list or removed from the list altogether. One embodiment of the method for presenting search engine results based on the domain name related reputation includes an Inquirer posting a search query to a search engine. The search engine forms search engine results based, at least in part, on the domain name related reputation and returns the results to the Inquirer.

The systems and methods of the present invention will help Internet users to combat various forms of Internet abuse.

The above features and advantages of the present invention will be better understood from the following detailed description taken in conjunction with the accompanying drawings.

DETAILED DESCRIPTION AND PREFERRED EMBODIMENT

Figure 1:
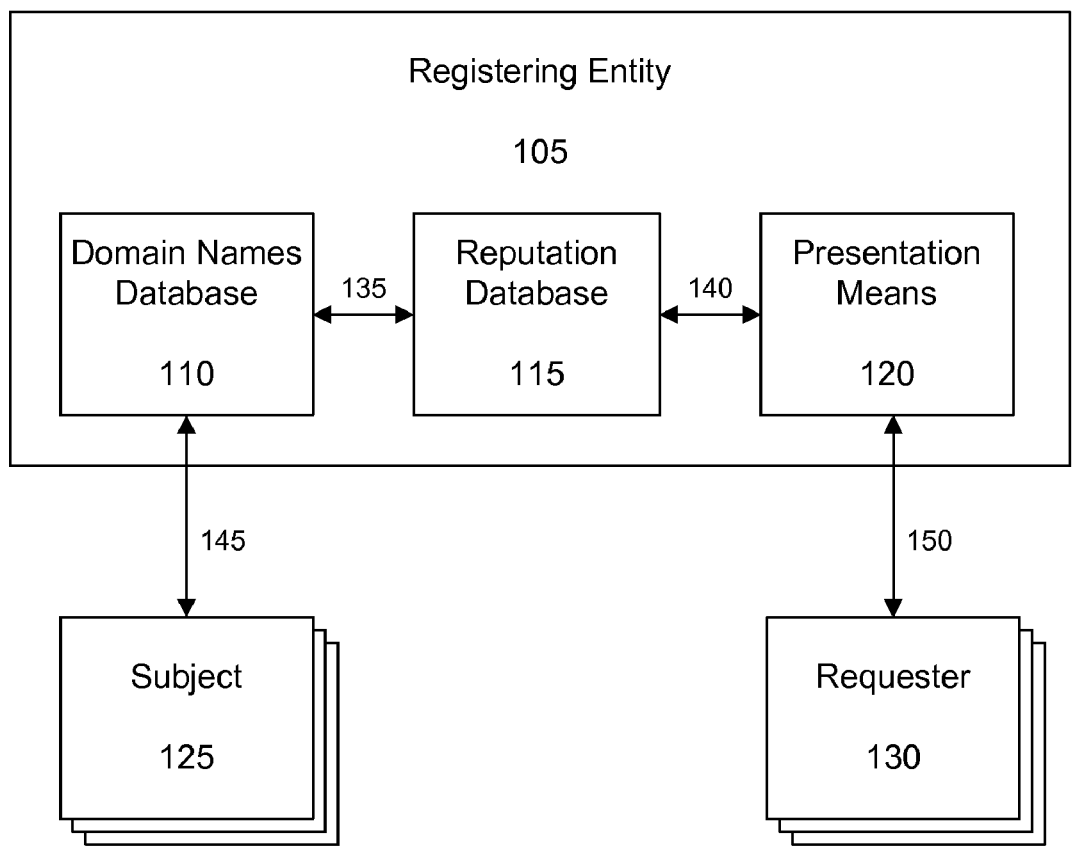
FIG. 1 is a block diagram illustrating a preferred embodiment of the system of the present invention.

The present invention will now be discussed in detail with regard to the attached drawing figures which were briefly described above. In the following description, numerous specific details are set forth illustrating the Applicant's best mode for practicing the invention and enabling one of ordinary skill in the art of making and using the invention. It will be obvious, however, to one skilled in the art that the present invention may be practiced without many of these specific details. In other instances, well-known machines and method steps have not been described in particular detail in order to avoid unnecessarily obscuring the present invention. Unless otherwise indicated, like parts and method steps are referred to with like reference numerals.

For the purposes of this application Registering Entity may include one or more domain name Registries, and/or one or more domain name Registrars, and/or one or more domain name Resellers.

Some embodiments of the present invention utilize the unique position of a Registering Entity on the Internet. For example, the Registrar has access to the domain name billing information and can determine who the purchaser of the domain is. The contact information in the domain name WHOIS records is provided by the registrant and is not always reliable. In this case, the Registrar may rely on the billing information. Further, the registrant may choose private registration and the registrant's WHOIS records will be hidden to the public. Nevertheless, the Registrar still has access to the registrant's private registration records. Typically, the Registering Entity has access to forwarding, masking, and DNS records of the domain name, thus if reputation values are determined for one of the domain names, those reputation values may be associated with all the domain names connected through forwarding, masking, or DNS records. Further, the Registering Entity may change WHOIS records; this allows the Registering Entity to save domain name related reputation information into the WHOIS records. If the Registering Entity is a hosting provider for the domain name, the Registering Entity may save domain name related reputation information into the DNS records as well.

The WHOIS data may be maintained by a Registry, a Registrar, and/or another party. "Thin" Registries store limited amount of information about a domain name; typically, it includes: "Domain Name", "Registrar", "Whois Server", "Referral URL", "Name Server", "Status", "Updated Date", "Creation Date", "Expiration Date", etc. "Thick" Registries in addition store Registrant, Administrative, Technical, and Billing contact information. Registrars usually store detail information about the domain names registered through them. Even though, the WHOIS is public records, many Registries and Registrars limit access to the WHOIS data by automated solutions (e.g. computer programs, scripts, "crawlers," etc.). This prevents copying substantial parts of the WHOIS database and potential use of this data for unsolicited email campaigns. Typically, the Registering Entity may avoid such limitations. Additionally, for the domain names registered through the Registrar, the Registrar has access to the domain name registrations, renewals, transfers, expirations, etc. in real time.

For the purposes of this application domain name related reputation data may include one or more values, ratings, or scores per a domain name. The data may further include links or references to the locations (typically on the network) where such values, ratings, or scores may be found.

Referring to FIG. 1, the preferred embodiment of the system of the present invention includes a Registering Entity 105, a Domain Names Database 110, a Reputation Database 115, a Presentation Means 120, a Subject 125, and a Requester 130. The Registering Entity 105 may be a domain name Registry, a Registrar of domain names, or a Reseller of a Registrar. The Registering Entity 105 may be an accredited ICANN (Internet Corporation for Assigned Names and Numbers) Registry or Registrar. Examples of ICANN-accredited Registrars include Go Daddy Software, Wild West Domains, etc. The Registering Entity 105 maintains the Domain Names Database 110. The Domain Names Database 110 is a database containing one or more domain names registered through or with the Registering Entity 105. The Subject 125 is a person or an entity associated with one or more domain names registered through the Registering Entity 105 (link 145).

The Subject 125 may be a client of the Registering Entity 105, a purchaser of products or services provided by the Registering Entity 105, a user of the products or services provided by the Registering Entity 105 (e.g. email account users), a registrant of one or more domain names registered through the Registering Entity 105, a person or entity on record with the Registering Entity 105 (e.g. billing records, private registration records, etc.), a person or entity appearing in the WHOIS records for one or more domain names registered through the Registering Entity 105 or any combination thereof. The system may include one or more Subjects. The system may also include one or more Registering Entities; for simplification purposes the system of FIG. 1 is described as having one Registering Entity.

The products or services provided by the Registering Entity 105 may include registering a domain name, providing an email service (account), hosting service, issuing a digital certificate, computer software, website designing tools and/or services, reputation tracking service or any combination thereof.

The Reputation Database 115 stores domain name related reputation data. There may be multiple records in the Reputation Database 115 for a single domain name from the Domain Names Database 110 (link 135). The Reputation Database 115 preferably would be maintained by the Registering Entity 105, but could be maintained by a third party. The Reputation Database 115 may store reputation records for various categories associated with a domain name. Such categories may include email practices, website content, privacy policies and practices, fraudulent activities, complaints, an overall reputation or any combination thereof. The overall reputation may be calculated from other reputation records using the sum, average, minimum, maximum, or any other formula. The reputation data may be tracked on a person or an entity, a domain name, a URL associated with the domain name, an email address or any combination thereof.

The Reputation Database 115 may hold data on the amount of spam that originated from a domain name email accounts (per week, per month, per year, total, etc.), number of complaints (about spam, about phishing, about other fraudulent activities), or website content (illegal drugs, alcohol, tobacco, sex, pornography, nudity, or any other form of adult content, profanity, violence, intolerance, hate, racism, militant groups, extremists, Satanism, witchcraft, gambling, casino, spam, MLM, pyramid schemes, fraud, or any other illegal activity, etc.). The values in the reputation data may be numeric ratings or values out of a predetermined set of discrete values. Examples of sets of discrete values include: Yes-No, Bad-Fair-Good-Excellent, etc.

The reputation values associated with a domain name itself, a domain name registrant (as appearing in WHOIS records), and a domain name purchaser (a person or entity billed) may differ. For example, the domain name purchaser may purchase domain names A, B, and C. The domain name registrant may be the same for domain names A and B, and different for C. Domain name A may have an "Under Construction" page, domain B may be used for an adult content website and domain C may be used for sending out spam. Even though the reputation ratings for domain name A itself would not indicate adult content or spam, the ratings for the purchaser of the domain name A, may so indicate. Similarly, the reputation ratings of the registrant of the domain name A may indicate adult content, because domain name A has the same registrant as domain name B.

The domain name registrant reputation values may be calculated as minimum, maximum, average, sum, or any other formula from some or all domain names with the same registrant. Similarly, the domain name purchaser reputation values may be calculated as minimum, maximum, average, sum, or any other formula from some or all domain names purchased by the purchaser. In effect the reputation associated with the Subjects (registrants, owners, clients, etc.) may cross multiple domain names.

The Reputation Database 115 may obtain various reputation data from other reputation services, such as SENDERBASE.ORG, Bonded Sender Program, SPAMCOP, "societies" of trusted users, black and white domain/IP/email lists, CLOUDMARK, VERISIGN Verified Domains List, TRUSTe, etc. The variety of reputation data may aid in making better decisions by the Requester 130.

Besides providing "raw" data in the Reputation Database 115 for the Requester 130 to make decisions, the Registering Entity 105 may provide suggestions or recommendations if a particular domain name, URL, email address, etc. should be trusted.

The Registering Entity 105 may start tracking domain name related reputation voluntarily or after a request from the Subject 125. The Registering Entity 105 may offer the reputation tracking as an additional service to the Registering Entity's clients.

The Requester 130 may be a person, an entity, or a technological means, such as a computer software, a website, a web service, etc. The system may include one or more Requesters. The data from the Reputation Database 115 may be provided to the Requester 130 via the Presentation Means 120 (links 140 and 150).

The Presentation Means 120 are means for presenting the data and may be maintained by the Registering Entity 105 and may include DNS records, WHOIS records, a website, a web service, a computer software, an API-based solution or protocol, or any combination thereof. For example, the Registering Entity 105 may post some reputation values in the domain name DNS or WHOIS records or post into DNS or WHOIS a URL link to the location on the network (e.g. Internet website) where the reputation data may be found.

In another embodiment of the invention the partners of the Registering Entity 105 may have access to the Reputation Database 115. The Presentation Means 120 in this embodiment may include a system that periodically feeds reputation data to the partners. The reputation data may be in XML (eXtensible Markup Language), character-delimited (e.g. CSV (Comma-Separated Values) or TSV (Tab Separated Values)), fixed length, or other formats.

The system of the present invention provides a framework, centralized around a Registering Entity, for accessing the reputation data. Any Internet or email user (or automated solutions) may find domain name related reputation data through a Registering Entity where the domain name was registered or in domain name WHOIS records as opposed to a variety of disconnected solutions that may exist presently. If a domain name is transferred from one Registering Entity to another, the reputation data may be transferred from one Registering Entity to another as well.

Figure 2:
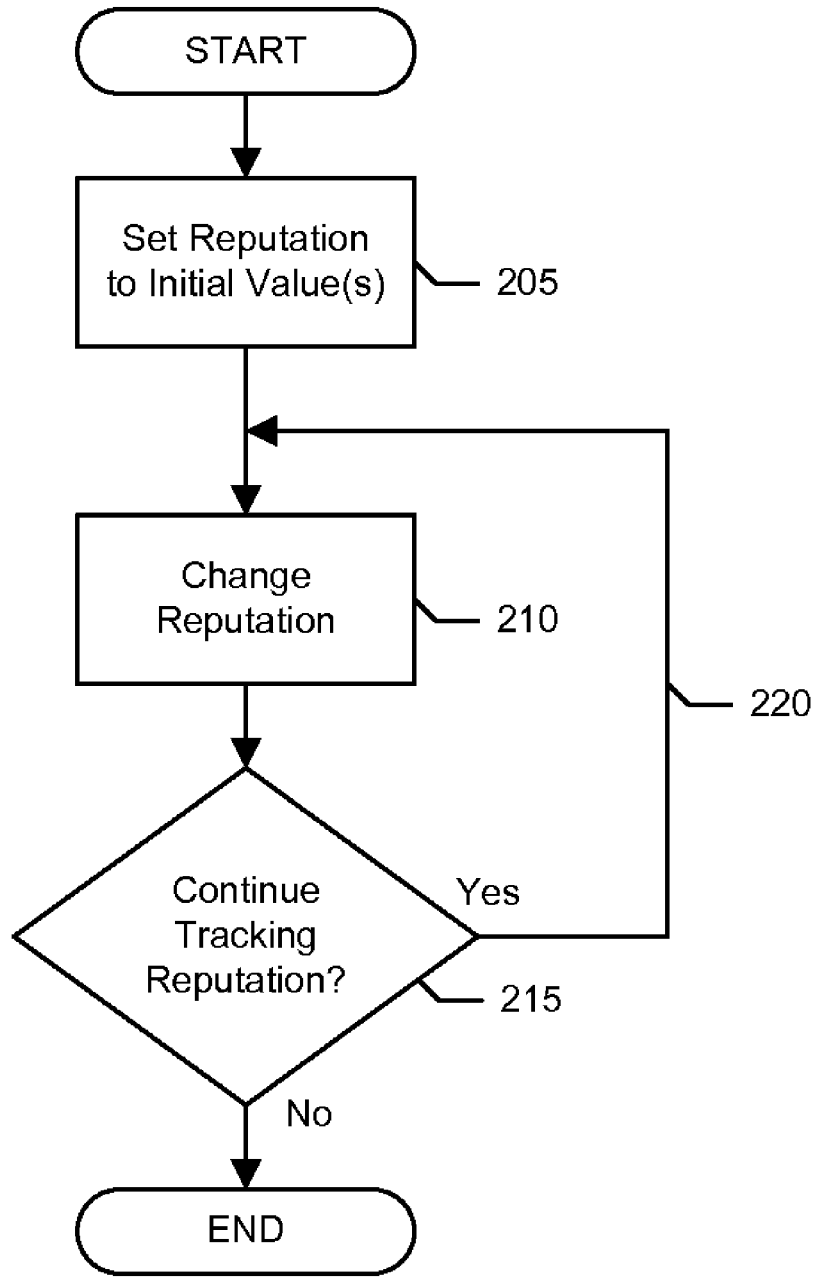
FIG. 2 is a flowchart illustrating a method of the present invention for tracking domain name related reputation.

FIG. 2 depicts a method in accordance with the teachings of the present invention for tracking domain name related reputation. A Registering Entity may set one or more values in domain name related reputation data to initial values (Step 205). The Registering Entity may change one or more values in domain name related reputation data (Step 210). If continuation of keeping track of the domain name related reputation is desired (Step 215), then Steps 210 and 215 may be repeated (Step 220).

The initial values may be set to null, zero, or any other value. The values may be on various scales, for example from 0 to 100, from 0 to infinity, or from −100 to 100, where 0 may represent a domain name with no reputation, etc. The Registering Entity may develop a schedule of points to be awarded for various events associated with the domain name.

For example, if the Registering Entity receives a legitimate complaint about a spam email message originating from a domain name, the email practices reputation rating (score, value) of the domain name and the email address reputation rating may be reduced by one. If the domain name exists for a year with no complaints, the domain name's overall reputation rating may be raised by 10 points. If the Registering Entity validates the domain name registrant contact information, the overall reputation rating may be raised by 20 points, etc. Additional points may be awarded if the domain name is assigned an SSL certificate issued by a certification authority. The rating may be reduced if illegal content is present on the domain name website.

If the domain name is transferred from one Registering Entity to another, if the registrant was changed, if ownership of the domain name was changed, or if the domain name expires, the ratings may be changed (e.g. reset to their initial values). Changes in the domain name registration information (contact or DNS) may trigger a change of the reputation ratings as well. Optionally, the Registering Entity may provide historical values of the reputation ratings.

Figure 5:
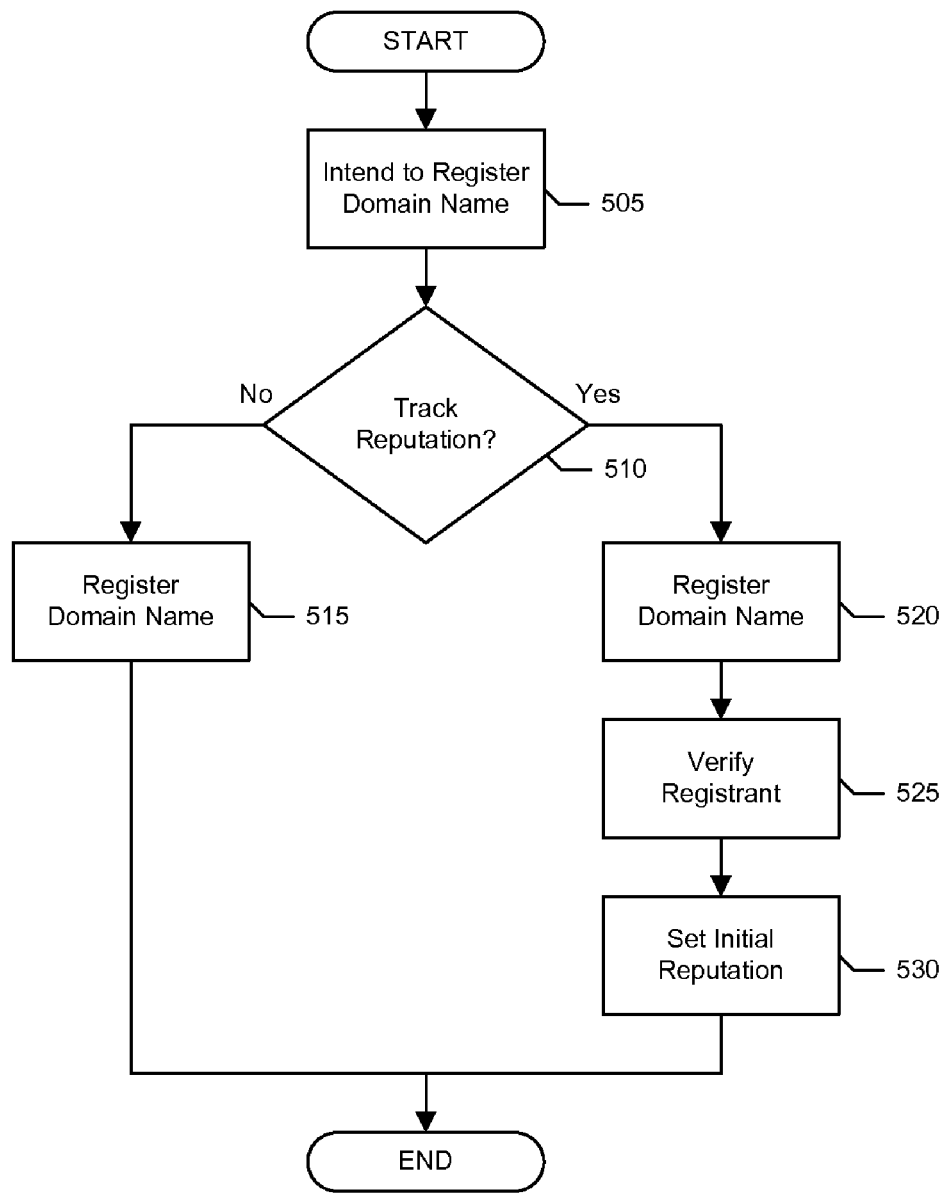
FIG. 5 is a flowchart illustrating a method of the present invention for initiating tracking of domain name related reputation at the point of sale of the domain name.

In another embodiment, referring to FIG. 5, domain name related reputation may be tracked from the point when the domain name is getting registered or renewed (point of sale). A registrant, who intends to register a domain name, may visit a Registering Entity's website (Step 505). The registrant is a person or entity, who registers the domain name; it may not be necessarily a person or entity, which appears in the WHOIS records. A Registering Entity may offer the registrant a reputation tracking service (Step 510). The reputation tracking service may be free of charge for the registrant or may be a paid service. If the registrant does not want the reputation tracking service, the Registering Entity will register the domain name (Step 515). If the registrant opts for the reputation tracking service, the Registering Entity will register the domain name (Step 520), may verify the registrant (Step 525), and then set initial reputation values in reputation data (Step 530).

Verification may include validating information appearing in the WHOIS records or in the private registration records, as well as validating registrant's business records, driver's licenses, or other documents. There may be multiple levels of verification performed. Basic levels may include validating some of the contact information appearing in the WHOIS record or in the private registration records. Advanced levels may include verification of a variety of registrant's documents. More extensive and comprehensive verification levels may result in higher reputation values (assuming the verification was successful).

In yet another embodiment, if the registrant does not opt for the reputation tracking service, the Registering Entity may still create reputation data for the domain name and populate it with some default values.

Figure 3:
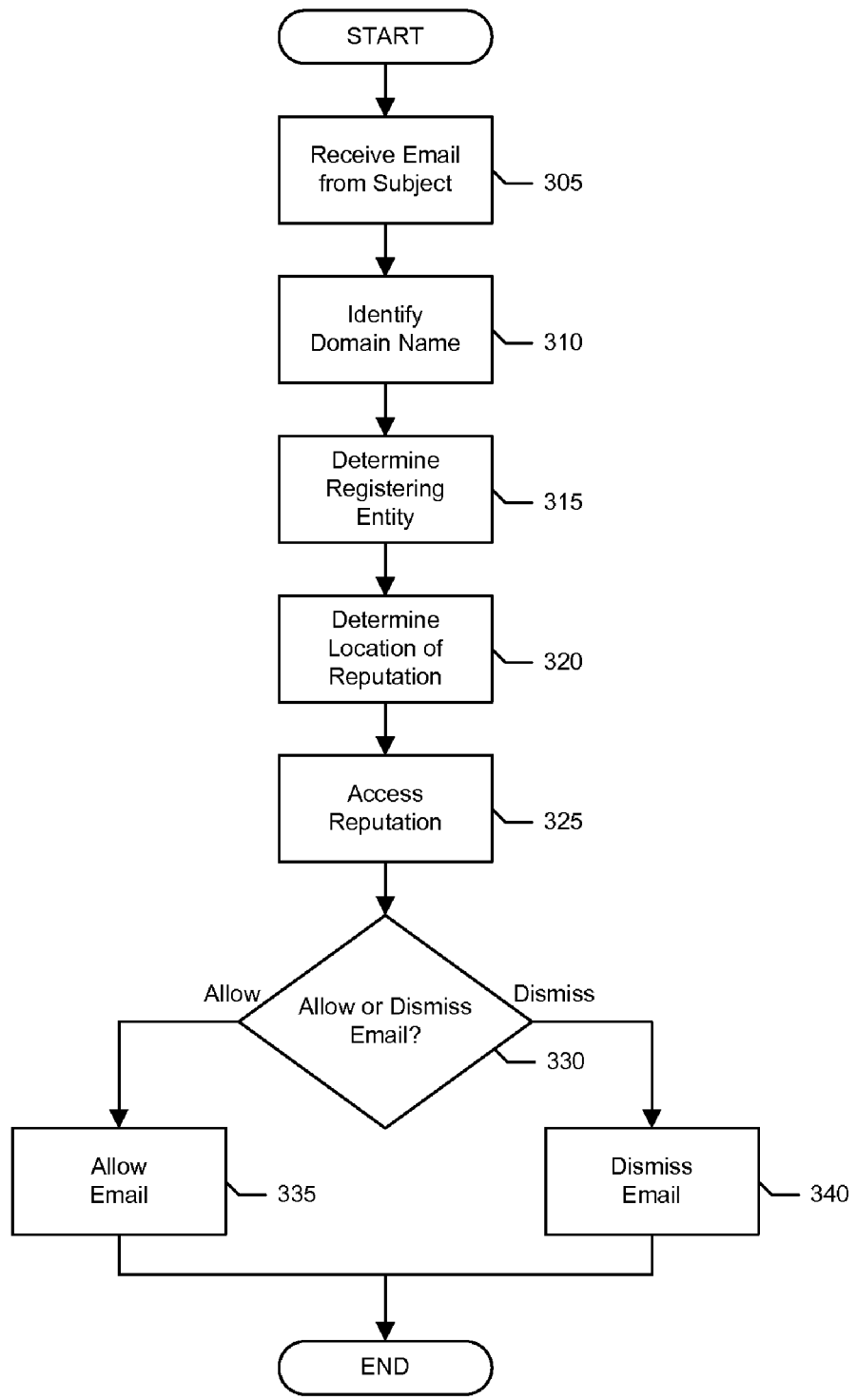
FIG. 3 is a flowchart illustrating a method of the present invention for accessing domain name related reputation after receiving an email message.

FIG. 3 illustrates a method for accessing domain name related reputation data after a Requester receives an email message. The method includes the following steps. A Requester receives an email message (Step 305). The Requester identifies a domain name (Step 310). The Requester determines a Registering Entity of the domain name (Step 315). The Requester determines the location of domain name related reputation data (Step 320). The Requester accesses the domain name related reputation data (Step 325). Based on the domain name related reputation data the Requester decides (determines) whether to allow or dismiss the email message (Step 330). Depending on that decision the Requester either allows the email message (Step 335) or dismisses it (Step 340).

Preferably, the Requester is computer software running in conjunction with an email server or a client email program. In Step 310 the Requester may identify a domain name from an email address of a sender. Additional steps may be taken to ensure that the email address of the sender was not forged (spoofed). If the Registering Entity in Step 315 is a Registrar, then the Registrar may be determined from the Registry's WHOIS records. Referring to Step 320, the location of the domain name related reputation data may be, inter alia, a database, a website, a web service, WHOIS records, DNS records, etc. The location of the domain name related reputation data may be a predetermined location (e.g. http://reputation.godaddy.com) or may be provided by a link or reference. The link or reference to the location may be, inter alia, a URL link, a DNS address, an IP address, a computer port or any combination thereof. For example, a URL link to the website where the reputation data is located may be specified in the WHOIS records. If the location of the domain name related reputation data is specified in the Registry's WHOIS records, then Step 315 (determining the Registering Entity) may be omitted. Step 320 (determining the location of reputation data) may include the following sub-steps: determine a location of the Registrar's WHOIS data from the Registry's WHOIS (e.g. whois.godaddy.com) and then obtain a URL to the domain name related reputation data from the Registrar's WHOIS.

The Requester decides (determines) whether the values in the domain name related reputation data are appropriate to allow the email message. The domain name related reputation data may have multiple values (ratings); it is likely that the rating(s) for email practices will be considered by the Requester. If the Requester decides to allow the email message, it may be placed into the user's Inbox. If the email message is not allowed, it may be deleted or placed in a special quarantine mailbox (e.g. "Spam", "Junk mail," "Bulk mail," etc.). Additionally, links to the webpages in the email message may be checked for their domain name related reputation and this information may be used in the decision of whether to allow the email message.

Figure 4:
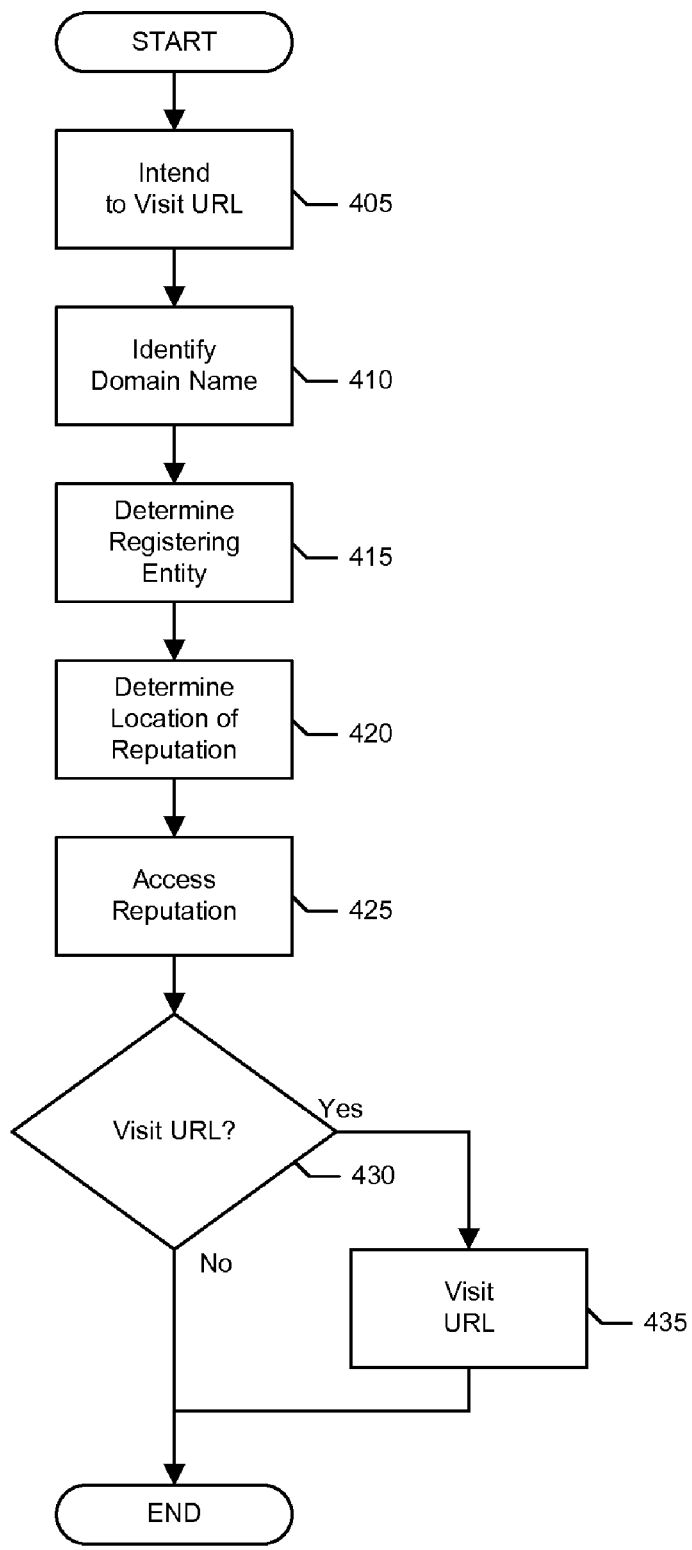
FIG. 4 is a flowchart illustrating a method of the present invention for accessing domain name related reputation before visiting a URL.

Similarly, the Requester may use domain name related reputation to determine if the Requester should visit a URL link. Referring to FIG. 4, a Requester intends to visit a URL (Step 405). The Requester identifies a domain name from the URL (Step 410). The Requester determines a Registering Entity of the domain name (Step 415). The Requester determines the location of domain name related reputation data (Step 420). The Requester accesses the domain name related reputation data (Step 425). Based on the domain name related reputation data the Requester decides (determines) whether the Requester should visit the URL (Step 430). If the Requester decides to visit the URL, it may do so (Step 435).

In this method the Requester may be computer software working in conjunction with an Internet browser. If the domain name and/or the URL have a low reputation, the webpage located at the URL may be blocked. Alternatively, the computer software may give the user a warning that the domain name and/or the URL have a low reputation. The user may then decide whether to visit the URL.

Each URL may have its own reputation rating. This is especially feasible when multiple parties are responsible for the content of a website associated with the domain name.

The Registering Entity or another party may publish domain name related reputation data in the DNS or WHOIS records. The reputation values (ratings, scores) or one or more URL links, where the reputation values can be found, may be published in the DNS or WHOIS records. The party that tries to access domain name related reputation data may obtain it, inter alia, from a predetermined URL on the Internet or from the DNS or WHOIS records. One embodiment of the method for publishing the domain name related reputation in the WHOIS records includes the following steps. The Registering Entity collects domain name related information and forms domain name related reputation data. Then, the Registering Entity stores the domain name related reputation data in the WHOIS records.

The domain name related reputation may also be used for presenting search engines results. Typically, the search engines results presented to the network users (or automated solutions) are based on their relevance (e.g. how often search terms are found on a webpage), date last updated, number of links to that webpage, etc. In the method of the present invention the network search engines may use reputation ratings as one of the parameters to be considered for sorting or ordering search results. Alternatively, links to the domain names with a low reputation may be excluded from the search results. The preferred embodiment of the method for presenting search engine results based on the domain name related reputation includes the following steps. An Inquirer posts a search query to a search engine. The search engine forms search engine results based, at least in part, on the domain name related reputation and returns the results to the Inquirer. The Inquirer may be a network user or an automated service querying the search engine. Search engine results may include links to websites, webpages, or documents on the networks. The networks may include the Internet.

Alternatively or additionally, reputation ratings (scores, values) may be shown next to (or in conjunction with) the links in the search engine results. Thus, allowing the network user to determine whether to visit the link or not. Further, the search engines may use domain name related reputation from various databases and sources, including those maintained by the Registering Entities.

The search engine may store reputation data with the links to the network documents and webpages. This may speed up the process of returning the search engine results to the Inquirer.

Other embodiments and uses of this invention will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the United States Patent and Trademark Office and the public generally to determine quickly from a cursory inspection the nature and gist of the technical disclosure and in no way intended for defining, determining, or limiting the present invention or any of its embodiments.

The invention claimed is:

1. A system for tracking domain name related reputation, comprising:
   a) a Domain Names Database for storing a Plurality of Domain Names registered through a Registering Entity, wherein said Domain Names Database is maintained by said Registering Entity, and
   b) a Reputation Database for storing a domain name related reputation data for one or more domain names out of said Plurality of Domain Names registered through said Registering Entity, wherein said Reputation Database is accessible via a computer network by a Plurality of Requesters.

2. The system of claim 1, wherein said Registering Entity is a domain name Registry.

3. The system of claim 1, wherein said Registering Entity is a domain name Registrar.

4. The system of claim 1, wherein said Registering Entity is a Reseller of a domain name Registrar.

5. The system of claim 1, wherein said data comprises a numeric rating or score, representing domain name related reputation.

6. The system of claim 1, wherein said data comprises a value out of one or more predetermined sets of discrete values, representing domain name related reputation.

7. The system of claim 1, wherein said data comprises a link or a reference to a location of an additional reputation data.

8. The system of claim 1, wherein said data comprises one or more records for a domain name itself.

9. The system of claim 1, wherein said data comprises one or more records for a URL associated with a domain name.

10. The system of claim 1, wherein said data comprises one or more records for a person associated with a domain name.

11. The system of claim 1, wherein said data comprises one or more records for an entity associated with a domain name.

12. The system of claim 1, wherein said data comprises one or more records for an email address associated with a domain name.

13. The system of claim 1, wherein said data comprises one or more records associated with email practices.

14. The system of claim 1, wherein said data comprises one or more records associated with website content.

15. The system of claim 1, wherein said data comprises one or more records associated with privacy policies and practices.

16. The system of claim 1, wherein said data comprises one or more records associated with fraudulent activities.

17. The system of claim 1, wherein said data comprises one or more records associated with domain name related complaints.

18. The system of claim 1, wherein said data comprises one or more records associated with domain name overall reputation.

19. The system of claim 1, wherein said data comprises one or more records indicating if a domain name can be trusted.

20. The system of claim 1, wherein said Reputation Database, at least in part, is maintained by said Registering Entity.

* * * * *